United States Patent Office 3,344,824
Patented Oct. 3, 1967

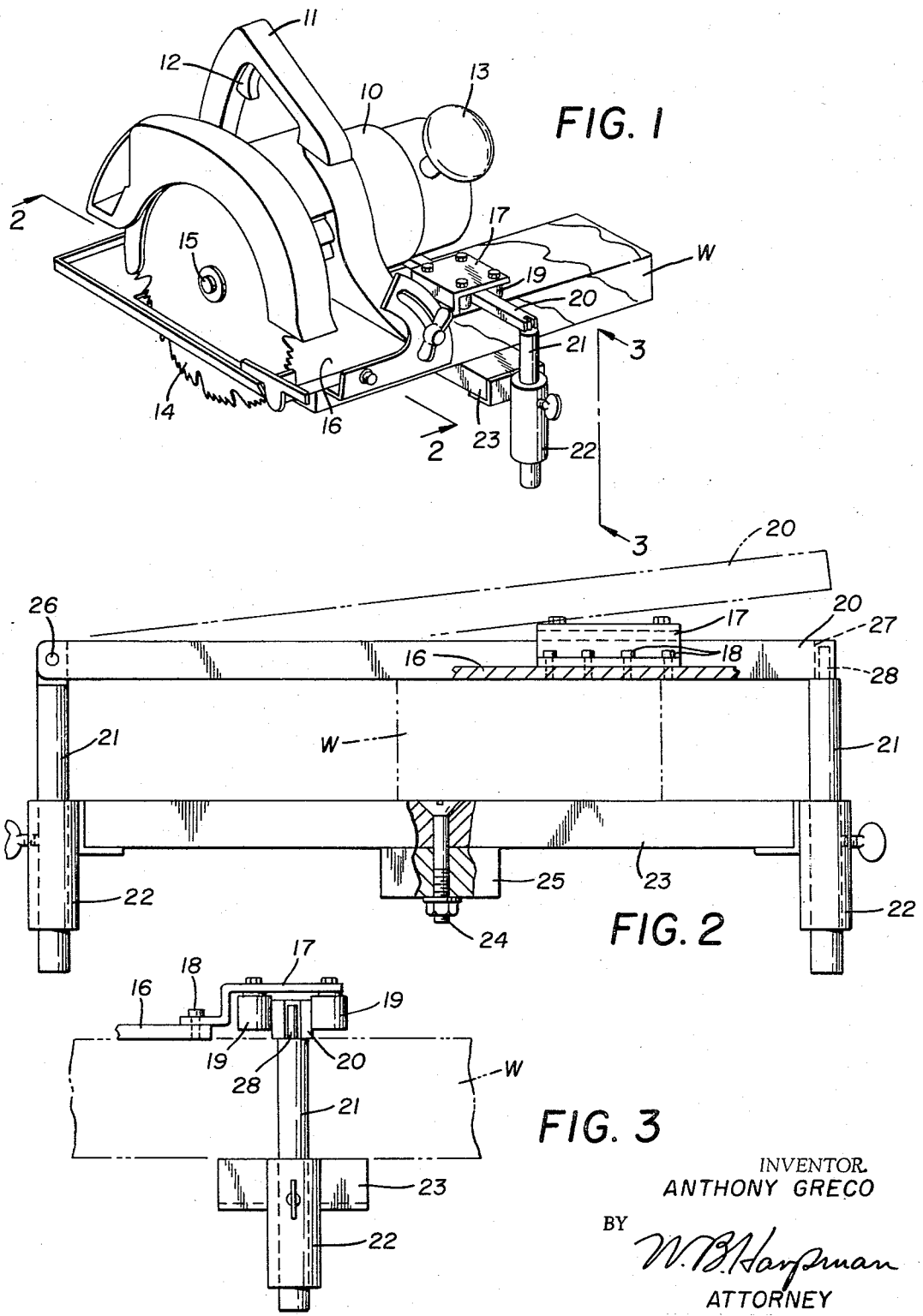

3,344,824
GUIDE DEVICE FOR PORTABLE ELECTRIC SAWS
Anthony Greco, Rte. 5, Box 209A, near
Fairmont, W. Va. 26554
Filed May 21, 1965, Ser. No. 457,751
3 Claims. (Cl. 143—160)

ABSTRACT OF THE DISCLOSURE

This invention is a guide device for a portable electric saw comprising in combination, follower means on the portable saw and a movable, adjustable, elongated guide registrable with the follower means, which device positively controls the direction of cut of a portable saw.

---

This invention relates to portable electric saws and more particularly to a guide device used in conjunction therewith to enable the portable electric saw to be guided at a desirable direction or angle as it traverses a piece of wood or other material to be cut.

The principal object of the invention is the provision of a guide device for a portable electric saw and comprising in combination follower means on the portable saw and a movable, adjustable elongated guide registrable with said follower means and adjustably located relative to a workpiece.

A further object of the invention is the provision of a guide device for a portable electric saw of simple and economic construction which may be easily attached to the saw and which will act as a support for the workpiece.

A still further object of the invention is the provision of a guide device for a portable electric saw comprising a movably mounted guide bar and a guide following member therefor, the member being attached to the portable electric saw and the guide bar arranged to both support the workpiece and guide the portable saw relative thereto.

A still further object of the invention is the provision of a guide device for a portable electric saw that may be used on a portable electric saw having a circular blade or a reciprocating bayonet blade.

A still further object of the invention is the provision of a guide device for a power saw that may be inexpensively formed and quickly and easily attached to a portable saw and used in connection with the workpiece to be cut thereby.

The guide device for a portable electric saw disclosed herein comprises a simple and efficient means of positively controlling the direction of cut of a portable electric saw relative to a workpiece such as a piece of wood or the like.

Those skilled in the art will observe that it has heretofore been necessary to determine the direction or angle of cut desired and layout or otherwise mark this direction or angle of cut on the piece of wood, or other material, to be cut and then manually direct the portable electric saw along the layout or cut line in an attempt to achieve a desired direction or angle of cut. The present invention provides a simple and efficient guide bar with an associated support which is either positioned on the end of a section of wood or other material to be cut or mounted independently and used to support the section of wood or other material to be cut, and arranged so that it can be positioned transversely of the material to be cut or at any desired angle relative to the length of the material to be cut.

The portable electric saw is provided with a follower guide including antifriction rollers, which engage the guide bar and thus positively insure the following or tracking of the portable electric saw in strict accordance with the predetermined positioning of the guide bar relative to the workpiece. The device is operative when the saw cuts with the blade on its vertical axis or when the same may be at an inclination from vertical, and at all times insures an accurate and positively uniform straight-across cut of the workpiece.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a perspective view of a portable electric saw showing the guide device therefor attached thereto and operative relative to a section if workpiece to be cut.

FIGURE 2 is an enlarged section on line 2—2 of FIGURE 1 showing the guide bar.

FIGURE 3 is an enlarged detail on line 3—3 of FIGURE 1.

By referring to the drawings and FIGURE 1 in particular, it will be seen that a portable electric saw has been disclosed which includes a motor housing 10, a principal handle 11 secured thereto incorporating a trigger switch 12 for the electric motor in the housing 10, and a secondary handle 13 secured to an extension of the housing 10 as customary in the art.

The portable electric saw includes a circular saw blade 14 revolvable on an axis comprising the drive shaft 15 of the portable electric saw, and it will be observed that the motor housing 10 is mounted on a base plate 16 by way of a pivotal mounting as customary in the art. The plate 16 is provided with an offset body member 17, which offset body member 17 may be attached to the plate 16 by fasteners 18 as best seen in FIGURES 2 and 3 of the drawings. The offset body member 17 is provided with four depending antifriction rollers 19 as seen in FIGURES 1 and 3 of the drawings, and these are spaced by their positioning on the offset body member so that they engage the opposite sides of a longitudinal guide bar 20. It will thus be observed that when the guide bar 20 is positioned relative to a workpiece, such as indicated by the letter W in FIGURE 1 of the drawings, and the rollers 19 of the offset body member 17 engaged thereon, the portable electric saw will of necessity be required to travel in a path parallel to the position of the guide bar 20.

In FIGURE 1 of the drawings, a workpiece W is disclosed which, for example, might comprise a section of wood such as a two by four or the like, and it will be observed that the guide bar 20 is positioned across the top thereof and supported at its opposite ends on vertically movable support columns 21 which are, in turn, adjustably mounted in tubular sockets 22. The tubular sockets 22 are carried on the outer ends of a frame 23 which in turn is pivotally mounted at its centermost point by means of a pivot bolt 24 to a secondary frame 25.

By referring now to FIGURES 2 and 3 of the drawings, it will be seen that one end of the guide bar 20 is pivoted by a pivot pin 26 to the upper end of a support column 21 to the left of FIGURE 2, and that the other end is notched vertically as at 27 so that it will register with a projection 28 of smaller diameter than the column 21 at the right hand of FIGURE 2. This particular arrangement is shown best in the side view comprising FIGURE 3.

It will thus be seen that when the secondary frame 25 is mounted on a suitable support (not shown), it will pivotally support the frame 23 which in turn carries the support columns 21 and the guide bar 20. The arrangement is obviously such that any size or thickness of workpiece may be readily positioned on the frame 23 and the guide bar 20 positioned appropriately on its upper surface, or opposite surface relative thereto, and spaced with respect to the portion of the workpiece to be cut. When the guide bar 20 is positioned either transversely, as shown, or at any other desired angle or position, the portable saw can then be engaged by means of the offset body 17 and its depending rollers 19 on the guide bar 20 and the saw then used to accurately and positively follow a predetermined direction of cut relative to the workpiece. The outermost pair of rollers 19 are so positioned on the offset body member 17 that their peripheral edges extend beyond the end of the same and may therefore directly engage either side of the guide bar 20.

It will thus be seen that the invention comprises the combination of the adjustably positioned guide bar 20 and the offset body member 17 with its guide bar engaging rollers 19 by means of which the several objects of the invention are readily accomplished. It will further occur to those skilled in the art that the particular means for adjustably supporting the guide bar 20 is merely a preferable arrangement and that obviously other equally workable means can be used without departing from the spirit of the invention; for example, the support columns 21 and the tubular sockets 22 may be threaded with nuts positioned thereon to lock the same.

It will thus be seen that the guide device for portable electric saws disclosed herein meets the several objects of the invention, and having thus described my invention, what I claim is:

1. A guide device for a portable electric saw comprising a body member having one portion offset from the other, spaced guide engaging means on said offset portion, the other portion of said body member having means arranged to be attached to a portable electric saw at one side thereof, and a guide bar and supporting means therefor, said spaced guide engaging means on said offset portion of said body member being registrable with said guide bar for movement longitudinally thereof, positioning means for said guide bar, said means comprising columns located at either end thereof, said guide bar being pivoted at one of its ends to one of said columns.

2. The guide device set forth in claim 1, and wherein said supporting means comprises a movable member, tubular sockets at the opposite ends of said movable member arranged to support said columns.

3. The guide device set forth in claim 2 and including a secondary support, said movable member pivoted midway between its ends to said secondary support.

References Cited

UNITED STATES PATENTS 2,773,523 12/1956 Hopla.
2,789,594 4/1957 Coleman.
3,011,530 12/1961 Lamb.
3,045,724 7/1962 Mitchell.

WILLIAM W. DYER, JR., *Primary Examiner.*

W. D. BRAY, *Assistant Examiner.*